Oct. 15, 1957  D. R. BUSS  2,809,463
CONTAINER FOR KEEPING LIVE EARTHWORMS AND THE LIKE
Filed March 25, 1950
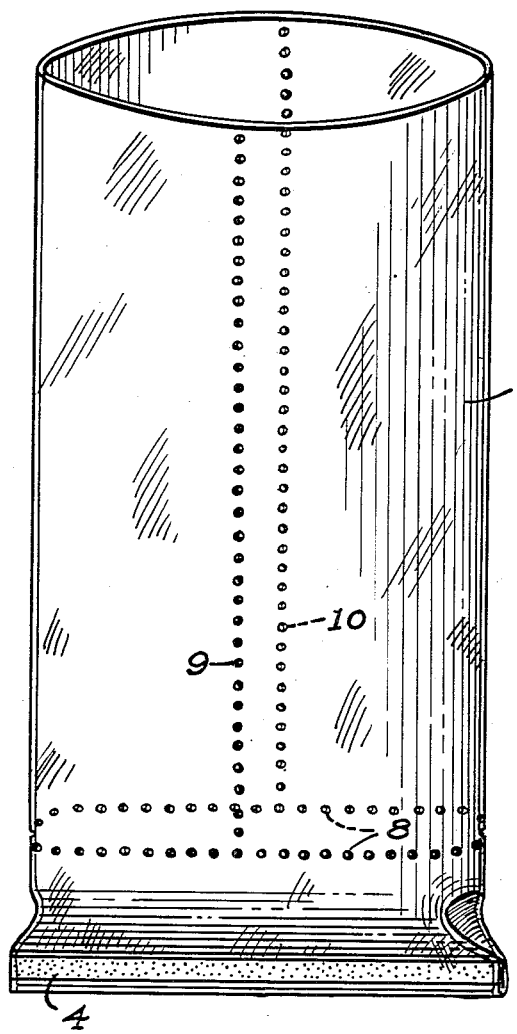
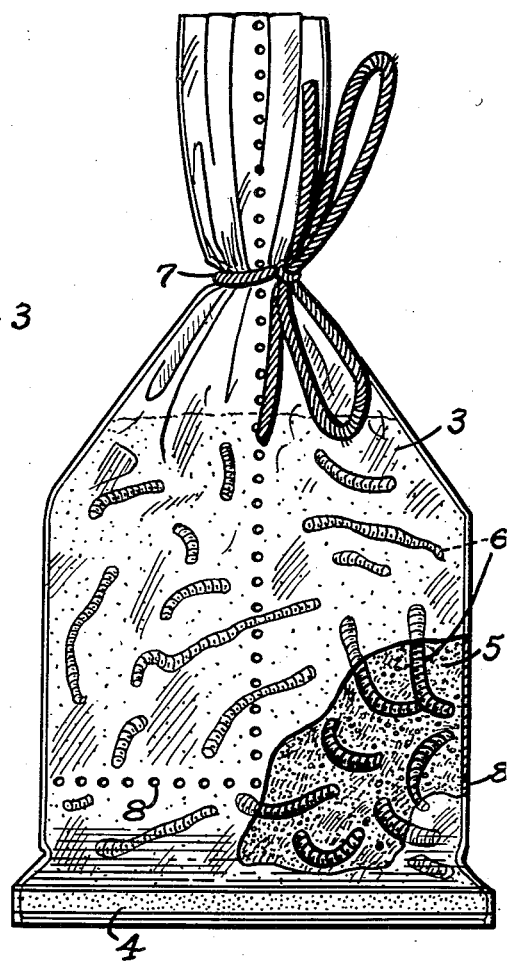
Inventor
Donald R. Buss

2,809,463
Patented Oct. 15, 1957

United States Patent Office

2,809,463
CONTAINER FOR KEEPING LIVE EARTHWORMS AND THE LIKE

Donald R. Buss, Lanark, Ill.

Application March 25, 1950, Serial No. 151,865

6 Claims. (Cl. 43—55)

This invention relates to a novel container for cleanly keeping alive and multiplying earthworms and the like used for fishing bait and soil building.

One of the principal objects of the invention is the provision of a waterproof container adapted for use both as a bait container and as a sales display container, the same being made preferably of flexible transparent plastic material through which the worms are easily visible and their vigor and liveliness may be noted, even though the worms are more or less covered by the food containing bedding material placed with the worms in the container.

A novel feature of this container is the provision of a horizontal row of perforations at a predetermined elevation with respect to the bottom of the container for the purpose of allowing entry of air needed to sustain life and also draining surplus water from the bedding, while trapping whatever water content there may be in the bottom portion of the container, whereby the all important water content of the bedding may be definitely controlled, and thereby safeguard the life of the worms for a long time in the event the need for adding water to replace what is lost by evaporation is overlooked after the containers are shipped from the farm or after they arrive at the customer's store or other destination.

Another novel feature of this container is the provision of perforations both for entry of air and for water drainage, the perforations being of a size small enough to prevent loss of any granular bedding material or the escape of any worms.

Another novel feature of the present container is the provision of perforations, the aggregate area of which in relation to the volume of bedding is such that worms have adequate air but drying out of the bedding is retarded so that the need for frequent rewetting is avoided.

Another novel feature is the arrangement of all of the secondary perforations in vertically spaced relation above the first mentioned horizontal belt of perforations, so that surplus moisture seeping slowly through these small perforations drains slowly over the outside of the envelope and evaporotes nearly as fast as it escapes so that a cooling action results which is especially desirable and highly beneficial in warm weather.

The plastic bag employed as the container is preferably made from material known as Bakelite polyethylene, which is ideal for the present purposes because it is not affected by water or worms and will not deteriorate or give off gases injurious to the worms or to the bedding, although, of course, other comparable waterproof plastic materials may be used. For purposes of comparison, I might add that metallic containers have been tried but found to be definitely inimical to worm life.

Another object of the invention is to provide a water absorbent bedding which allows air and oxygen to pass freely through it, so that it is ideal as a habitat for earth, blood, and sand worms, the same furthermore containing the necessary food and grit not only to sustain their life for much longer periods than has heretofore been considered possible, outside their natural habitat, but keep them in such good an vigorous physical condition as to make them better adapted for use as fishing bait, or for breeding and transplanting for soil building.

A feature of the present water absorbent bedding and water trapping container used in connection therewith, which is responsible for its success, is the fact that this combination, if used properly, insures that the water content is always just enough higher than the water content of the worms, to maintain them in good health.

Another feature of the present worm bedding is that it will not heat, mold, or give off offensive odors.

Still another feature of the present worm bedding is its high water retaining ability which accounts for its keeping the bodies of the worms wet without smothering them as ordinary wet soil would, fresh water being required for earth worms, and ocean or saltine water for blood and sand worms.

A further feature of this bedding material is its thermal insulating and retaining properties, which are beneficial when worms have to be shipped long distances during hot weather, because it is found that if the bedding is once cooled to the desired temperature it will keep that temperature for a long time, thus enabling shipment of worms is the hottest weather.

The invention is illustrated in the accompanying drawing in which:

Fig. 1 is a perspective view of the transparent, flexible, waterproof, plastic bag used as the container, in accordance with my invention, the same being shown empty so as to better reveal the arrangement of the perforations mentioned above, and Fig. 2 is a side view of the filled and tied container, as it appears on display in the fisherman's supply store ready for sale, and as it appears ready for shipment from the breeding farm, a portion of the wall of the container being broken away for purposes of better illustration.

The same reference numerals are applied to corresponding parts in these two views.

Referring to the drawing, the reference numeral 3 designates the transparent plastic bag, preferably, though not necessarily, made in the form of a seamless tube, the bottom end of which is sealed, as indicated at 4, by bonding or welding walls together in abutting relationship, in a manner well known to the plastic industry. The open-mouth bag is nearly filled, as shown in Fig. 2, with a specially prepared worm-food bedding 5 and a predetermined number of worms 6 are added, and then the bag is closed preferably by a tie string 7. The bedding is wetted well before being placed in the container, fresh water or saline water being used, depending upon the kind of worms packaged for shipment. Surplus water drains from the container mainly through a horizontal series of perforations 8 in the side walls of the container in a belt line that extends all around the container at a predetermined elevation from the closed bottom, the height of these perforations being such that preferably approximately 10% of the volume of bedding 5 will be assured of retaining all of its moisture at the outset, as a reserve supply, in case it should be needed later by reason of no rewetting of the bedding when that becomes advisable or really necessary. Some drainage also occurs through two vertical series of perforations 9 and 10 provided in the side walls on diametrically opposite sides of the container on lines at right angles to and extending upwardly from the line of the perforations 8. There is a certain amount of seepage of moisture continuously through these perforations 9 and 10 even after the surplus moisture has drained out, leaving a reserve supply pocketed or trapped in the bottom portion of the container, and this moisture dries on the outside of the container about as fast as it comes out, and this evaporation is beneficial in its cooling effect on the container and its contents. The perforations 8–10 are all about 1/32" diameter, too small to give rise to any danger of bedding material being lost or of any worms escaping. The aggregate area of these holes 8–10 is about 2% of the total area of that portion of the bag that is filled, thereby establishing the desired control as to rate of evaporation of moisture, while admitting enough air and oxygen to sustain life and avoid any likelihood of the bedding heating, and getting moldy.

The bedding 5, which is covered by my Patent No. 2,790,716, issued April 30, 1957, consists of the following:

| | Pounds |
|---|---|
| Wood pulp paper (1/16" screen fineness) | 45 |
| Alluvium (1/32" screen fineness) | 55 |
| Cellulose sponge (1/2" screen) | 2 |
| Oatmeal (course ground) | 10 |

The wood pulp paper is of a fluffy nature, does not mat, and is not eaten by the worms. The alluvium furnishes the food and grit necessary for all worms' digestive tract. The chopped up cellulose sponge absorbs twenty times its weight in water and is therefore employed to hold moisture. However, all of the components have a fairly high water retaining ability, so that the worms are assured of keeping wet enough and yet not be in danger of smothering. The oatmeal is consumed by the worms as food. The bedding 5 also has good thermal insulating properties so that worms may be shipped and moved safely long distances even during very hot weather, especially if the bedding is first cooled to the desired temperature, the bedding absorbing outside heat very slowly.

The package and/or worm bedding will be sold to worm breeders and shippers, the package being designed to be used by individuals for keeping worms from year to year, or from one wet period until the next wet period.

The construction enables replenishing the moisture content without opening the bags, namely, by placing the bags for a time in water to a depth slightly above the level of holes 8 only long enough to allow some absorption of water by the bedding 5 through the holes 8 and a few of the lower holes 9 and 10.

It is believed the foregoing description conveys a good understanding of the objects and advantages of my invention. The appended claims have been drawn with a view to covering all legitimate modifications and adaptations.

I claim:

1. As an article of manufacture, an open mouth bag of waterproof material suitable for containing a moist worm bedding, the side and bottom walls of said bag being imperforate except for a plurality of small drain and air inlet openings provided in a line in horizontally spaced relation in the side wall a fraction of the way up from the bottom to the level to which the bag is adapted to be filled with the bedding, the openings being too small for passage of an earth, sand or blood worm therethrough, said bag being adapted to be maintained in a substantially upright position when partially filled with moistened bedding.

2. As an article of manufacture, an open mouth bag of waterproof material suitable for containing a moist worm bedding, the side and bottom walls of said bag being imperforate except for a plurality of small drain and air inlet openings provided in a line in horizontally spaced relation in the side wall a fraction of the way up from the bottom to the level to which the bag is adapted to be filled with the bedding, the openings being too small for passage of an earth, sand or blood worm therethrough, the bag also having a second plurality of similar small openings provided in a line in the side wall in vertically spaced relation upwardly from the level of the first openings, said bag being adapted to be maintained in a substantially upright position when partially filled with moistened bedding.

3. As an article of manufacture, an open mouth bag of waterproof material suitable for containing a moist worm bedding, the side and bottom walls of said bag being imperforate except for a plurality of small drain and air inlet openings provided in a line in horizontally spaced relation in the side wall a fraction of the way up from the bottom to the level to which the bag is adapted to be filled with the bedding, the openings being too small for passage of an earth, sand or blood worm therethrough, the volumetric capacity of the lower portion of the bag below the level of said openings being in the range of from 5 to 15% of the volumetric capacity of that much of the bag adapted to be filled with bedding, said bag being adapted to be maintained in a substantially upright position when partially filled with moistened bedding.

4. As an article of manufacture, an open mouth bag of waterproof material suitable for containing a moist worm bedding, the side and bottom walls of said bag being imperforate except for a plurality of small drain and air inlet openings provided in a line in horizontally spaced relation in the side wall a fraction of the way up from the bottom to the level to which the bag is adapted to be filled with the bedding, the openings being too small for passage of an earth, sand or blood worm therethrough, the bag also having a second plurality of similar small openings provided in a line in the side wall in vertically spaced relation upwardly from the level of the first openings, the total area of the openings being in the range of from 1 to 5% of the area of that much of the bag containing bedding, said bag being adapted to be maintained in a substantially upright position when partially filled with moistened bedding.

5. In combination, a worm food containing bedding having a high water absorbing property and containing water in excess, an open mouth bag of waterproof transparent material in which said bed is confined, said bag being imperforate except for a plurality of small drain and air inlet openings provided all in substantially the same horizontal plane in the side wall a small fraction of the way up from the bottom in relation to the level to which the bag is filled with said bed, said bag being adapted to be maintained in a substantially upright position when partially filled with a moistened bed, the openings being too small for passage therethrough of an earth, sand, or blood worm and being adapted only for draining the excess of water from the upper major portion of the bed so as to leave the original excess of water in the bottom portion of the bed as a reserve supply.

6. In combination, a worm food containing bedding having a high water absorbing property and containing water in excess, an open mouth bag of waterproof transparent material in which said bed is confined, said bag being imperforate except for a plurality of small drain and air inlet openings provided all in substantially the same horizontal plane in the side wall a small fraction of the way up from the bottom in relation to the level to which the bag is filled with said bed, said bag being adapted to be maintained in a substantially upright position when partially filled with a moistened bed, the openings being too small for passage therethrough of an earth, sand, or blood worm and being adapted only for draining the excess of water from the upper major portion of the bed so as to leave the original excess of water in the bottom portion of the bed as a reserve supply, the bag also having all in substantially the same vertical plane a second plurality of similar small openings in vertically spaced relation upwardly from the horizontal level of the first-mentioned openings, whereby in the drainage of excess water from the upper major portion of the bag by seepage through said vertically spaced openings the water dries on the outside of the bag substantially as fast as it escapes through said openings, the evaporation of this water giving a desirable cooling effect.

References Cited in the file of this patent

UNITED STATES PATENTS

| | | |
|---|---|---|
| 174,346 | Beach | Mar. 7, 1876 |
| 180,953 | Spratt et al. | Aug. 8, 1876 |
| 690,854 | Grant | Jan. 7, 1902 |
| 886,337 | Balken | May 5, 1908 |
| 1,150,776 | Lamb | Aug. 17, 1915 |
| 1,597,640 | Vordemfelde | Aug. 24, 1926 |
| 1,725,864 | James | Aug. 27, 1929 |
| 1,810,745 | Austin | June 16, 1931 |
| 2,083,479 | Speare | June 8, 1937 |
| 2,253,688 | Collins | Aug. 26, 1941 |
| 2,257,879 | Graham | Oct. 7, 1941 |
| 2,316,607 | MacDonald | Apr. 13, 1943 |
| 2,573,202 | Kent | Oct. 30, 1951 |